No. 767,769. PATENTED AUG. 16, 1904.
H. SAULER.
STRAW BALING MACHINE.
APPLICATION FILED JULY 30, 1902.
NO MODEL. 8 SHEETS—SHEET 5.
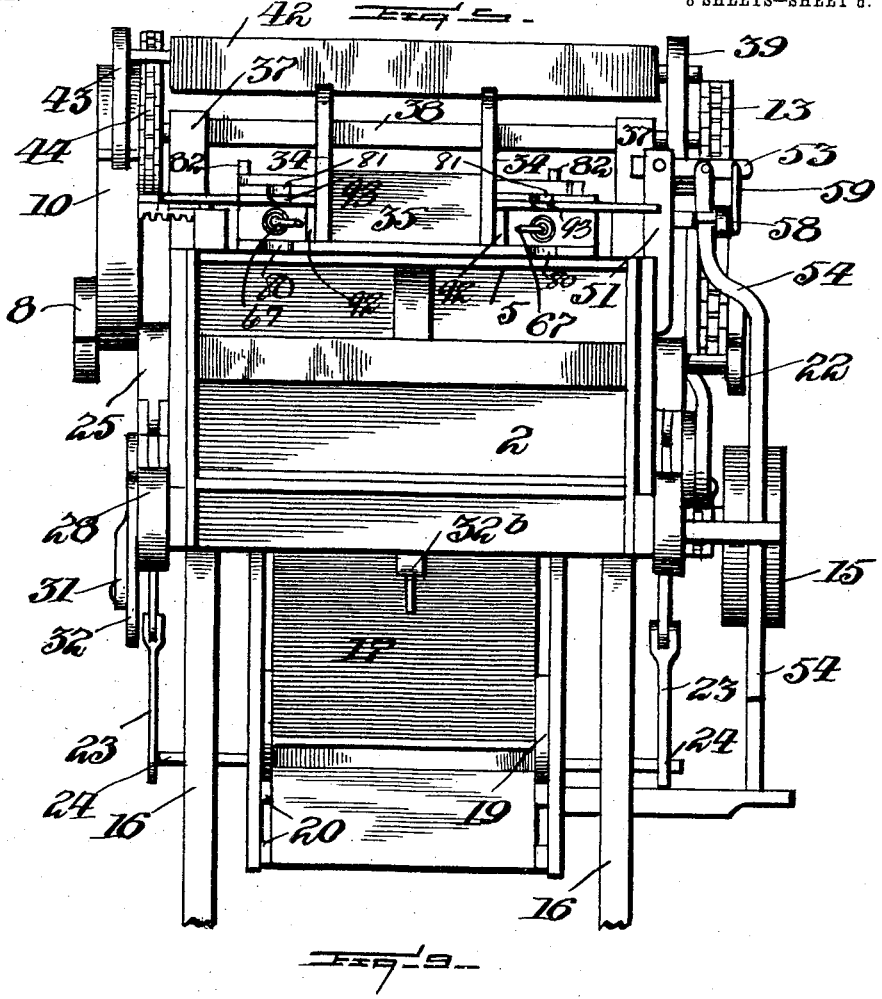
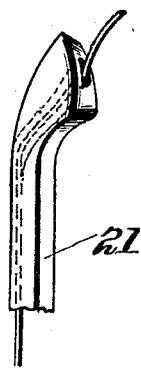
Witnesses:
Inventor
Herman Sauler,
By
Attorneys

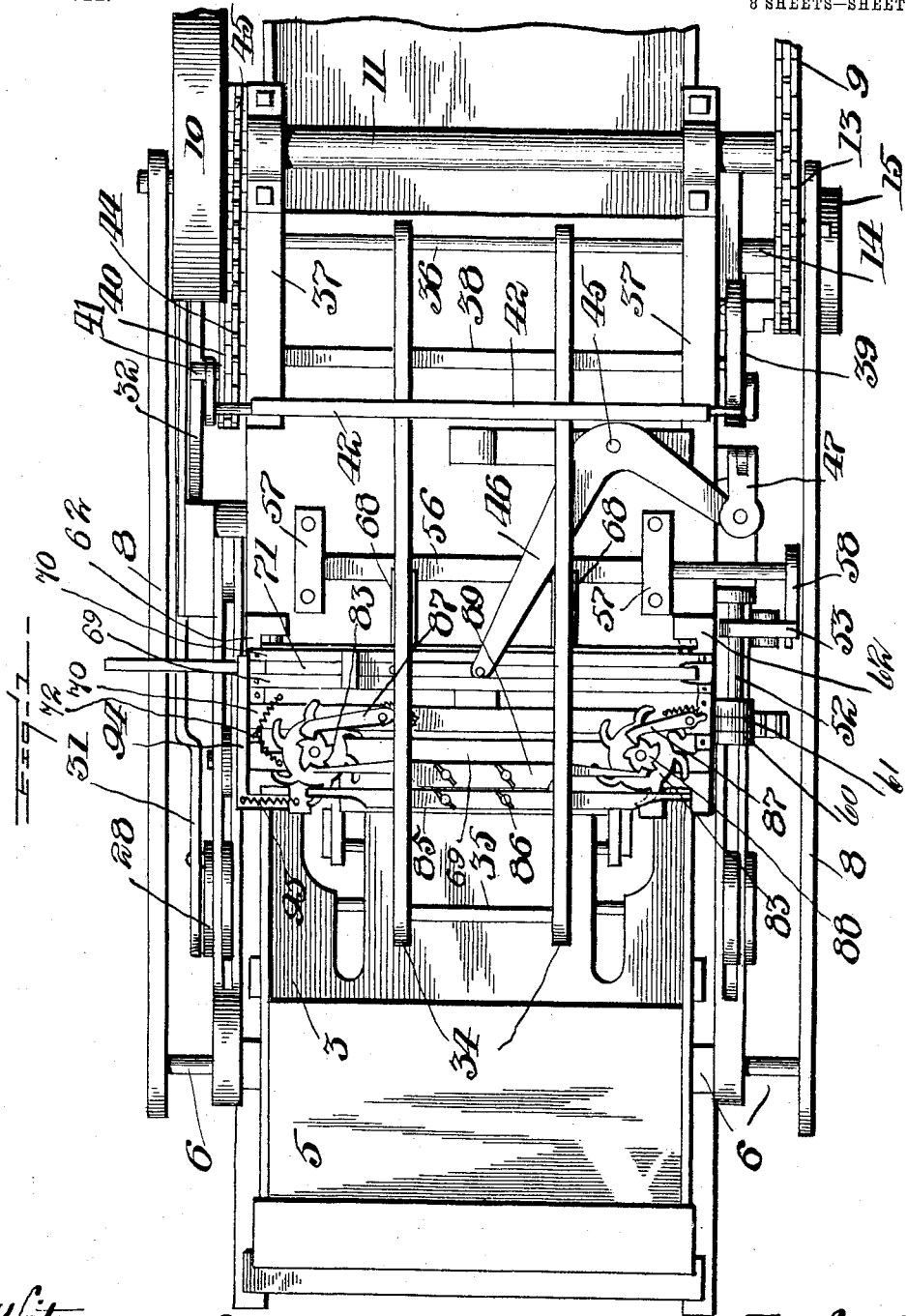

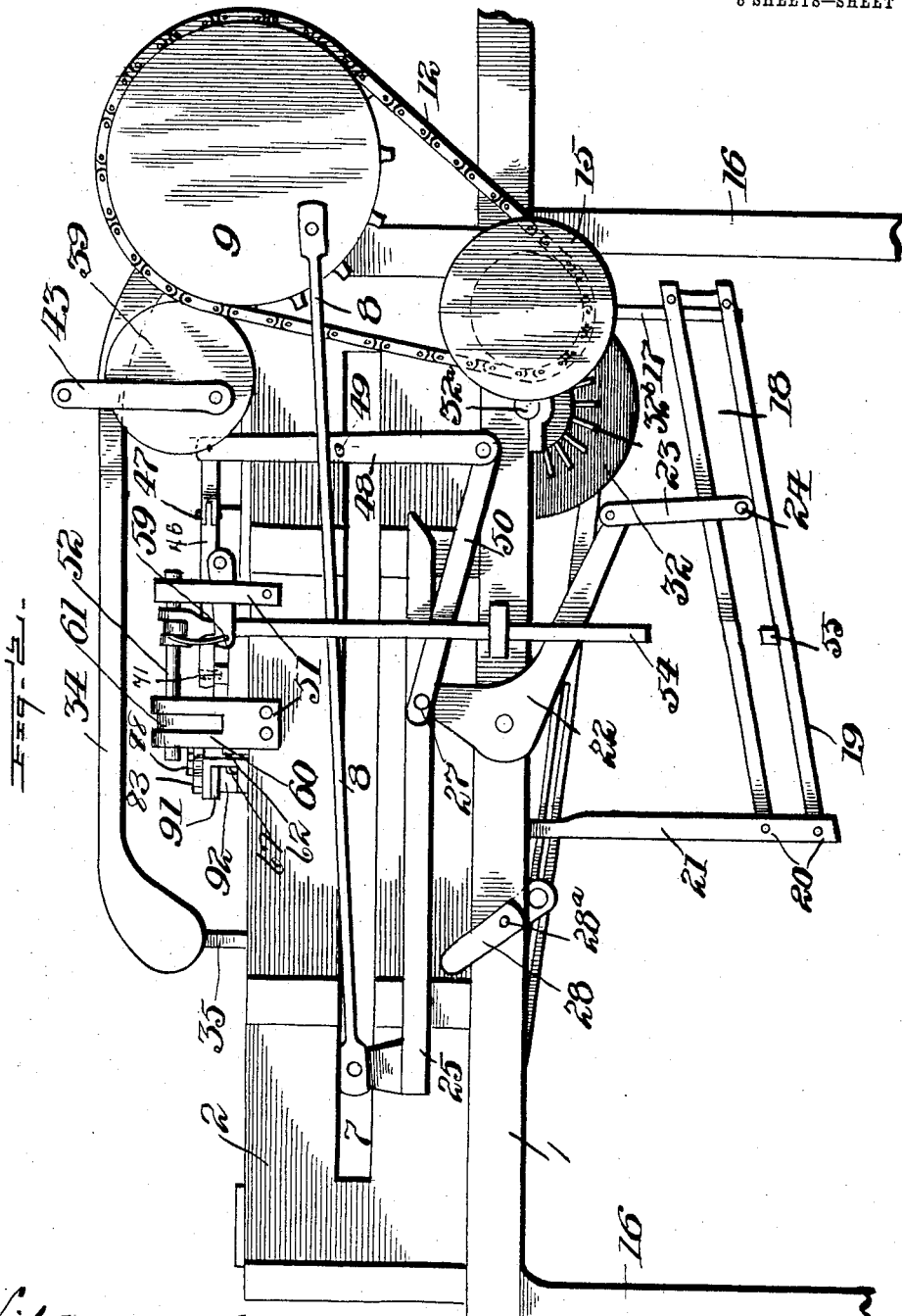

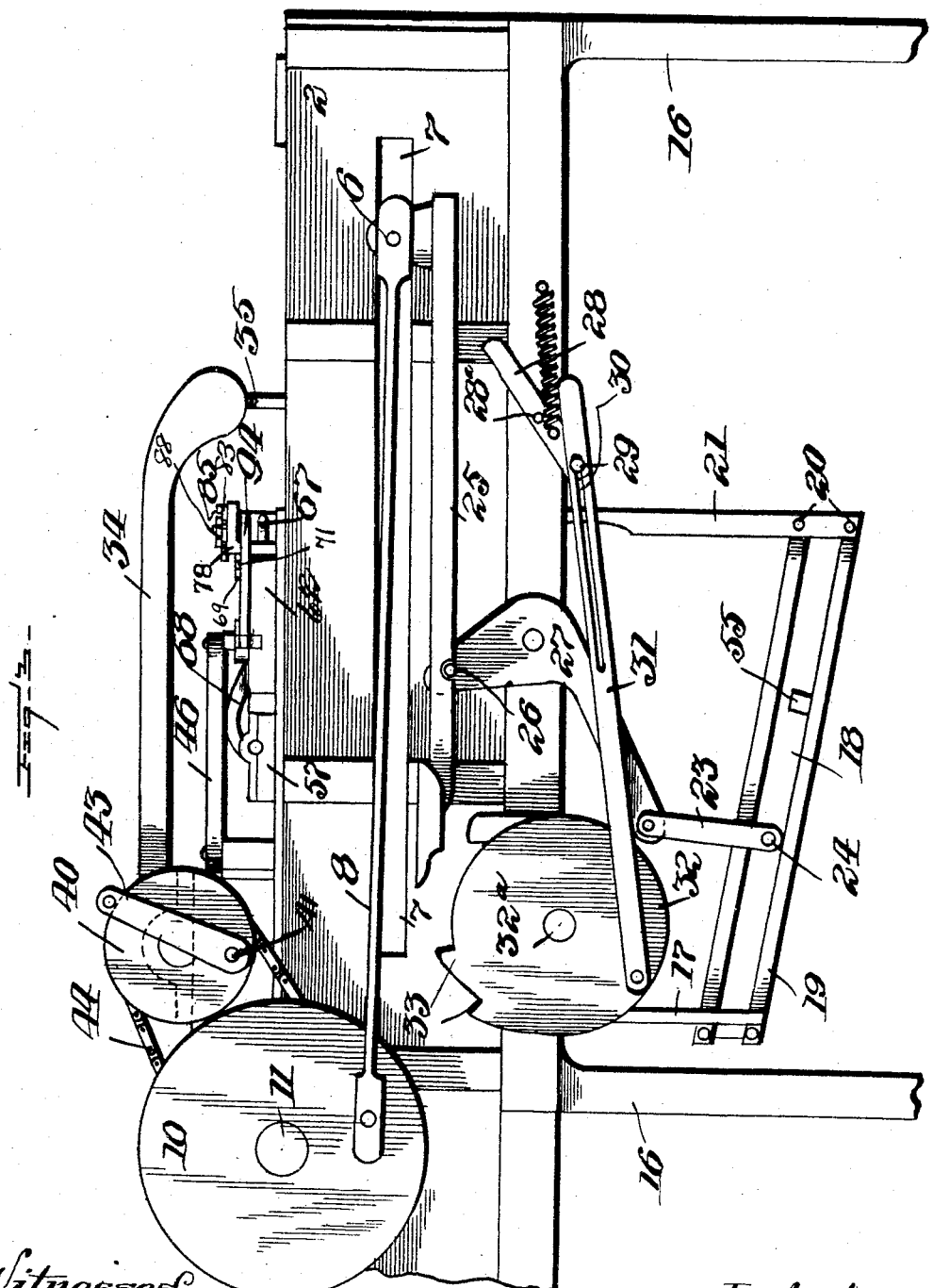

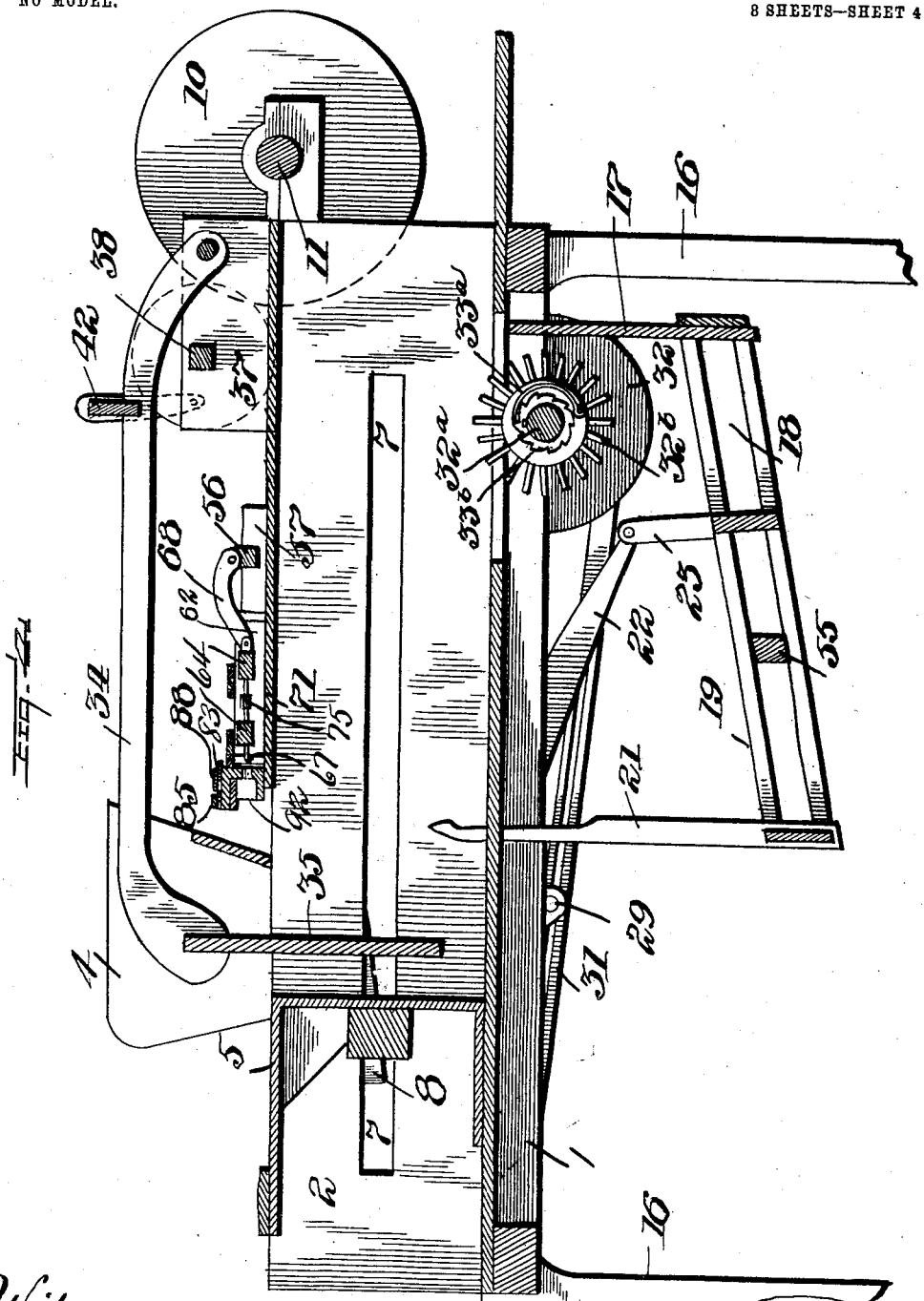

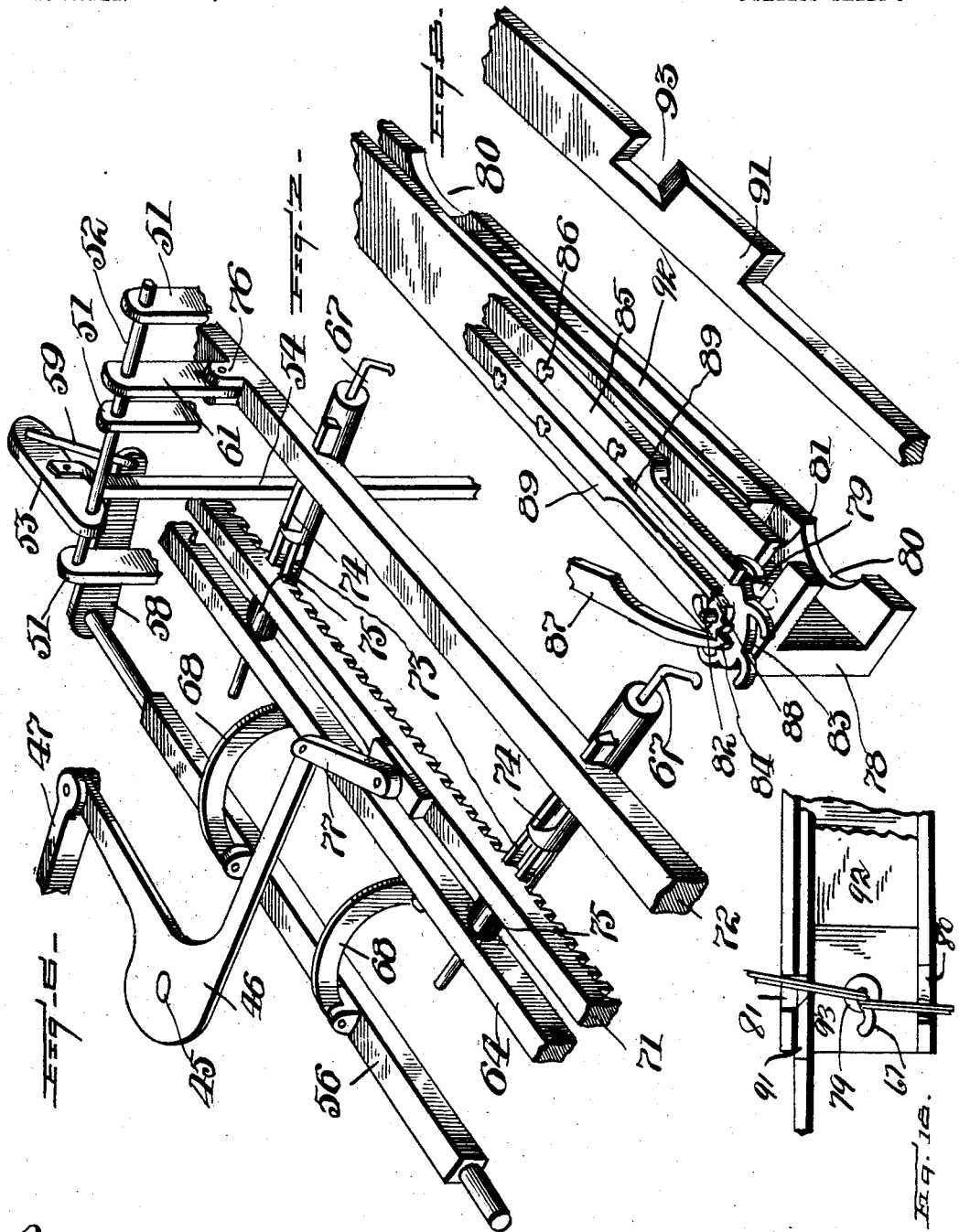

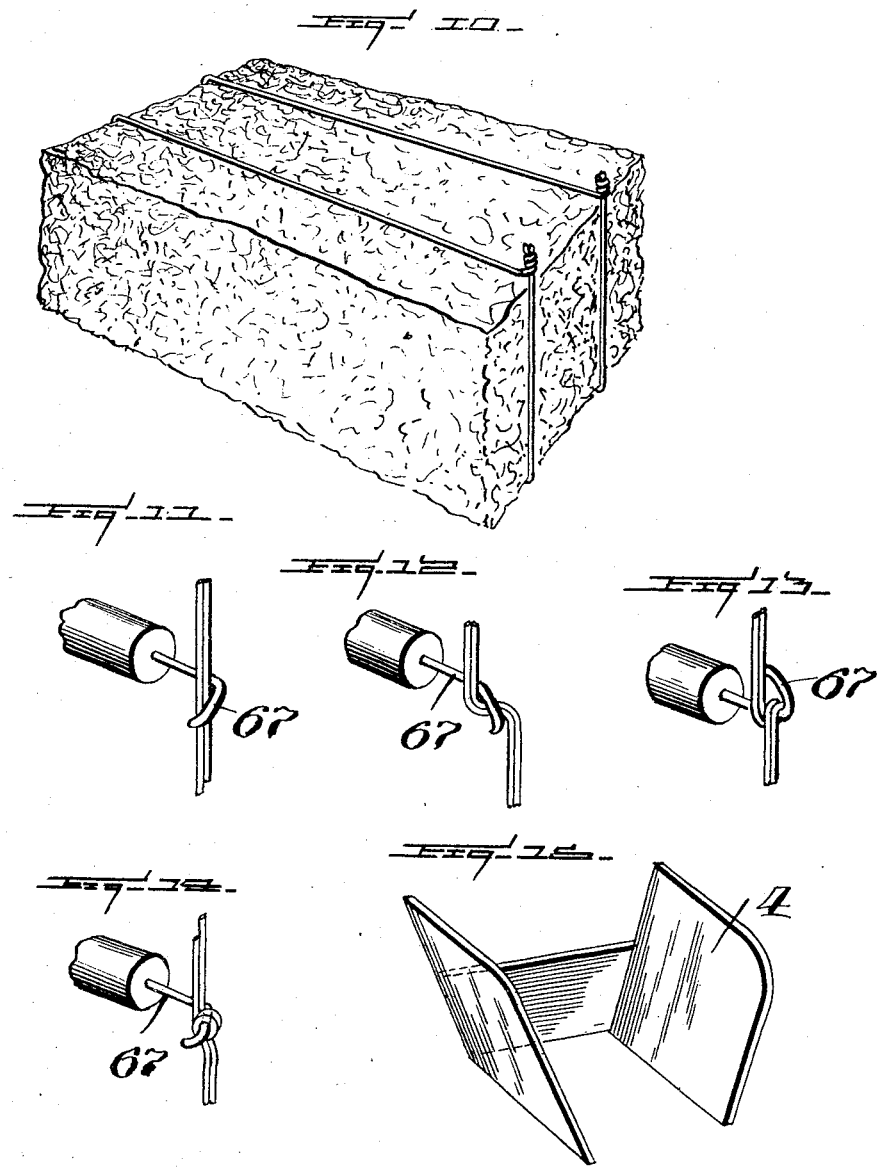

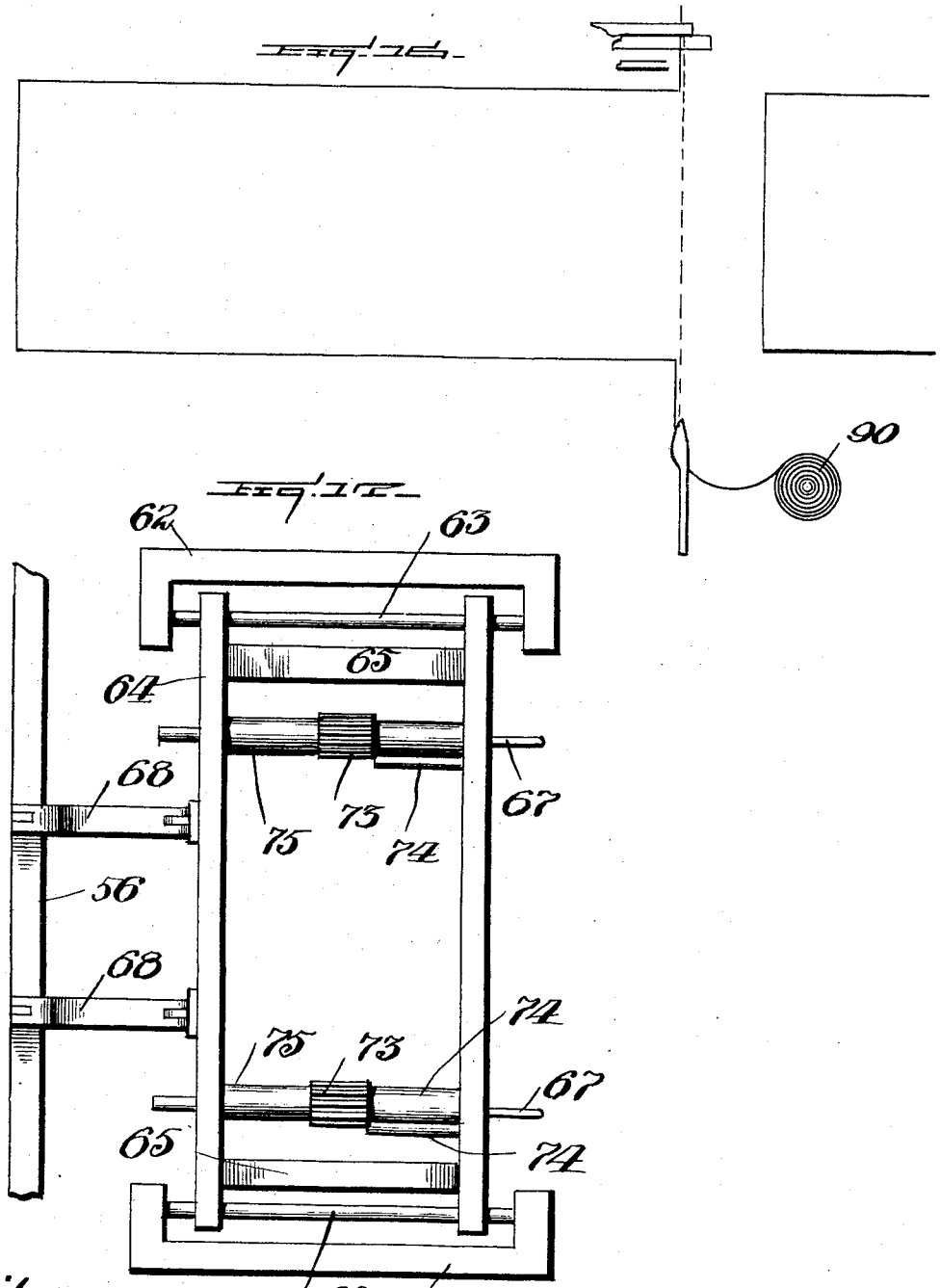

No. 767,769. Patented August 16, 1904.

UNITED STATES PATENT OFFICE.

HERMAN SAULER, OF ALLEGHENY, PENNSYLVANIA.

STRAW-BALING MACHINE.

SPECIFICATION forming part of Letters Patent No. 767,769, dated August 16, 1904.

Application filed July 30, 1902. Serial No. 117,660. (No model.)

*To all whom it may concern:*

Be it known that I, HERMAN SAULER, a citizen of the United States of America, residing at Allegheny, in the county of Allegheny and State of Pennsylvania, have invented certain new and useful Improvements in Straw-Baling Machines, of which the following is a specification, reference being had therein to the accompanying drawings.

This invention relates to certain new and useful improvements in machines for compressing hay, straw, and other similar materials into bales and to retain the form and compression of the bales by wrapping them with wires and tying the latter to form continuous bands around the bales.

An object of my invention is to provide novel means for feeding the material into the bale-box; further, to provide a sliding plunger within the bale-box which automatically forces the material back from the hopper as it is fed in.

A further object of the invention is to provide an improved construction of driving mechanism for the bale-tie devices which is adapted to be automatically thrown out of operation as the plunger-head is being reciprocated.

Further, the invention contemplates the provision of a pair of needles of novel construction for carrying the tie-wire through the bale-box and a knife actuated by the tie-forming mechanism for severing the wire after the ties have been formed.

Other objects and advantages of the invention will be hereinafter set forth and the novel features thereof defined by the appended claims.

Referring to the accompanying drawings, forming a part of this specification, and wherein like numerals of reference indicate like parts throughout the several views, Figure 1 is a top plan view of my improved baling-press. Fig. 2 is a side elevation thereof. Fig. 3 is a view similar to Fig. 2, but taken from the opposite side of the machine. Fig. 4 is a central longitudinal sectional view. Fig. 5 is an end view of the baling-press. Fig. 6 is a detail perspective view of the tie-forming hooks and the immediate mechanism for operating the same, parts being broken away. Figs. 7 and 8 are detail fragmentary views of the knife-casing and the knife-blade, respectively. Fig. 9 is a detail view of the upper portion of one of the wire-carrying needles and showing the arrangement of the wire therein. Fig. 10 is a view in perspective of the wired bale, showing the arrangement of the bands and the twist given to the ends thereof. Figs. 11, 12, 13, and 14 are detail views showing the various movements of the wire-twisting fingers during the formation of the bale-ties. Fig. 15 is a view in perspective of the removable hopper. Fig. 16 is a diagram showing the position of one of the tie-wires and needles relative to the bale-box and other parts. Fig. 17 is a top plan view of the wire-twisting fingers, the frame therefor, and the immediate parts, the mechanism for rotating said fingers being removed; and Fig. 18 is a fragmentary view, in front elevation, of the knife-casing and showing the relative position of the knife to one of the wire-twisters prior to the cutting of the wires.

1 indicates the base, having thereon the baling-box 2, provided in its upper side intermediate its ends with an opening 3, in which is fitted the removable hopper 4 and beneath which a reciprocatory plunger 5 is arranged in the baling-box. In the drawings I have shown the base supported by legs 16. This base, however, may be supported in any desired manner, either for transportation or cooperation, with an adjacent machine. The plunger 5 is provided at its opposite sides with extensions 6, slidably mounted in the longitudinal slots 7 of the baling-box sides, and is reciprocated by the pitmen 8 8, which have their forward ends mounted on said extensions 6 and their rear ends eccentrically secured to the outer faces of the sprocket-wheel 9 and disk 10, respectively. The sprocket-wheel 9 and disk 10 are rigidly secured to the shaft 11, journaled in suitable bearings on the top of the baling-box. 12 indicates a sprocket-chain which passes over the sprocket-wheel 13, mounted on the power-shaft 14, and over the sprocket-wheel 9, by which the shaft 11 is rotated and the plunger reciprocated.

15 indicates the belt-pulley.

17 indicates a support secured to the lower face of the base and to the opposite sides of which is pivotally mounted the needle-supporting frame 18. This frame 18 comprises two pairs of side bars 19, one pair of which is arranged at each side of the support 17 and pivoted at their rear ends to the support 17.

As shown in the drawings, each pair of side bars 19 are spaced apart and have their forward ends held in their relative positions by means of a spacing-block, on the ends of which are arranged the studs 20, to which the forward ends of the bars 19 are pivoted. These lugs likewise support the needles 21, one being arranged on each side of the frame 18 and provided in its lower portion with a pair of openings in which the outer ends of the said studs are received.

22 indicates bell-crank levers pivoted to the base and having their lower arms pivotally connected, by means of the links 23, to the needle-frame, as at 24. 25 indicates horizontally-arranged connecting-rods, each being provided with a longitudinal slot and provided on its lower face with a cut-out portion 26, in which is received the studs 27 of the bell-crank lever. These rods have their forward ends loosely mounted on the extensions 6 of the plunger and are adapted to receive the upper ends of the bell-crank levers in their longitudinal slots. It will thus be apparent that as the plunger is reciprocated movement is transmitted through the connecting-rods 25 to the bell-crank levers 22, causing the latter to oscillate, and consequently raising and lowering the needle-frame. As the needle-frame is elevated and lowered the side bars swinging on their pivotal points will maintain the needle at all times in an approximately vertical plane.

In connection with the needle-frame-operating mechanism I provide means whereby the connecting-bars can be elevated, thereby disengaging them from the studs 27 of the bell-crank levers 22, and thereby throwing the needle-frame-operating mechanism out of operation. This mechanism comprises the rock-arms 28, secured on the shaft $28^a$, journaled in the base. One of these arms is provided at its lower end with a stud 29, arranged in the slot 30 of the link 31, which link is pivoted eccentrically on the disk 32, fixed on the shaft $32^a$. This disk is provided on its periphery with a pair of ratchet-teeth 33, adapted to be engaged by the forward end of one of the connecting-rods, which on the forward movement of the plunger engages one of the said ratchet-teeth and imparts a partial turn to the disk 32, whereupon the link 31 will be forced forward and the studs on the rock-arm coming in contact with the ends of the slots will be elevated so as to assume a vertical position, during which movement the upper ends of the said rock-arm will contact with the connecting-rods 25 and elevate the same, as heretofore described. As the bale assumes approximately its proper size it will contact with the toothed drum $32^b$ on the shaft $32^a$ and rotate the same, thereby rotating the disk 32, and through the link 31 will lower the rock-arms 28, thereby permitting the connecting-arms to again assume their lowered positions.

34 indicates the oscillating frame of the feeder 35. This frame comprises a pair of side bars spaced apart and having their rear ends rigidly secured to the shaft 36, journaled in the standards 37.

38 indicates a shaft similar to the shaft 36 and being also journaled in the standards 37. To the ends of this shaft 38 is secured the crank-disk 39 and sprocket-wheel 40, respectively. Secured on the outer face of the sprocket-wheel 40 is a stud 41.

42 indicates a cross-beam secured to the frame 34 and having its ends connected by the links 43 to the stud 41 and the crank-disk 39, respectively.

44 indicates a chain passing over the sprocket-wheel 45, secured on the shaft 11 and the sprocket-wheel 40, whereby as the shaft 11 is rotated a rotary movement will be imparted through the chain 44 to the sprocket-wheel 40 and the crank-disk 39, thereby oscillating the feeder-frame. Journaled on the vertically-disposed stud 45 is the bell-crank lever 46, having its outer end pivoted to the link 47.

48 indicates a vertical rock-arm pivotally mounted on the stud 49 and having its lower end connected to one end of a link 50, said link having its opposite end connected to one of the studs 27 of the bell-crank.

51 indicates standards or uprights, in which is journaled the shaft 52, having an outwardly-projecting arm 53, to which is pivoted the vertically-movable rod 54. This is adapted to be struck by the extension 55, carried by the needle-frame, whereby the shaft 52 will be given a partial turn.

56 indicates a transversely-arranged rock-shaft journaled on top of the baling-box in bearings 57 and provided at one of its ends with a fixed crank-arm 58, which is in turn pivotally secured to the arm 53 by means of the link 59. The upper end of one of the standards 51 is bifurcated, as at 60, in which portion is arranged the rock-arm 61 on the shaft 52. Arranged on opposite sides of the top of the baling-box and adjacent to the standards 51 thereof I provide approximately U-shaped brackets 62, these brackets having arranged in their inturned ends suitable guides 63, upon which the wire-tie-forming-fingers frame 64 is slidably mounted, as shown in Fig. 17. This frame 64 comprises a pair of parallel side bars and longitudinal brace-bars 65. Within the sides of this frame are journaled the body portion of the wire-twisters. These wire-twisters have their forward ends bent to form hooked fingers 67 and have their body portion enlarged, which enlarged portion is arranged between the side bars of the frame 64. Links 68 are connected to the rear side bar of the frame 64 and to the rock-shaft 56.

69 and 70 indicate guides secured on top of the U-shaped brackets 62 and in which are slidably mounted the two rack-bars 71 and 72, respectively. The enlarged body portion of the respective wire-twisters 66 are approximately circular in cross-section and are provided intermediate their ends with the pinions 73, teeth 74, and smooth portion 75.

By referring to Fig. 6 it will be observed that the rack-bar 71 is arranged on the smooth portion 75 of the respective wire-twisters and the bar 72 is in engagement with the teeth 74 thereof. As the frame is drawn rearward, however, the rack-bar 71 meshes with the pinions 73. The bar 72 is reciprocated by the arm 61, which is pivoted thereto, as at 76, and the rack-bar 71 is reciprocated by the bell-crank lever 46, which is connected thereto by the link 77.

78 indicates a casing secured to the top of the baling-box in front of the rack-bars and having its rear wall provided with openings 79, through which project the forward ends of the wire-twisters. The upper and lower walls of the said casing are provided with the cut-out portions 80 and slots 81, the function of which will be hereinafter explained.

82 indicates studs secured to the top of the casing 78 a little in the rear of the slots 81 thereof and on which are journaled the wire-gripping wheels 83. These wheels are provided with integral peripheral curved fingers 84, which extend over the respective slots.

85 indicates a device for holding the wire end while the bale is being formed. This comprises a metallic rod which is secured in position on the casing 78 by means of set-screws 86 and having its opposite end extending partially over the wheels 83. These wheels are rotated by means of the spring-pressed member 87, pivotally mounted on the slide-bar 72, said hooks 87 engaging the small ratchet-wheels 88, and thereby rotating the gripping-wheels. These gripping-wheels are prevented from turning in the wrong direction by means of the pawls 89. The wire is temporarily held by the device 85; but when the wheels are rotated the wires are tightly impinged against the upper face of the casing on the opposite sides of the openings 81 thereof.

In the operation of my invention it will be seen that the plunger 5 is reciprocated within the press by means of the pitman 8, operated by disk and sprocket-wheel 9 and 10, respectively, which are driven by the power-shaft 14 through the medium of the chain 12, and when the connecting-rods 25 are elevated the plunger will operate entirely independently of the other parts. The connecting-rods being connected to the plunger and bell-cranks 22, an oscillatory movement will be given the bell-cranks as the plunger is reciprocated, thereby raising and lowering the needle-frame and causing the needles to pass upward through the baling-box and casing 78. The wires are then passed by hand over one of the hooks of the respective gripping-wheels and clamped under the holding device 85. The needles are then lowered, and the continued action of the plunger collects the bale and withdraws the wire from the reel 90, and thus carrying the wires forward into two loops similar to the loop shown in Fig. 16. The needles and plunger are so timed that as the plunger is moving back from the hopper the needles enter. A particular advantage resides in my improved means for throwing the needle-operating mechanism out of operation, inasmuch as it is this arrangement that permits the plunger to reciprocate and form a complete bale before the needles again move upward to form the complete bale-bands. At the completion of the bale the connecting-rods are again lowered into engagement with the studs of the bell-crank levers 22, whereupon the needles are moved upward and the wires again caught on another of the fingers 84 and secured to holding device 85 and the arm 48 will be rocked, thereby operating the bell-crank 46, which in turn reciprocates the rack-bar 71. Simultaneous with the reciprocation of the rack-bar 71 the needle-frame is operated, and during the upward movement thereof its extension 55 contacts with the rod 54 and forces the same upward and which in turn rocks shaft 52 and shaft 56. The rocking of the shaft 52 reciprocates the notched bar 72, which, as will be apparent, imparts a part turn to the respective wire-twisters, and as this notched bar is reciprocated the frame, with the wire-twisters thereon, is drawn rearward by the rock-shaft 56, thereby throwing the rack-bar 71 into mesh with the pinion 73 and which rack-bar further twists the wire to form a secure tie, as shown in Figs. 13 and 14. After the ties are thus formed they are removed from the twisters by hand.

In order to cut the wire, I arrange a cutter-blade 91 on the block 92 in the casing 78, said cutter-blade having cut-out portions 93, which are normally in alinement with the openings 80 and 81 of the said casing. This cutter-blade is provided at one of its ends with an angular extension 94, which is adapted to lie adjacent one end of the rack-bar 71, as is clearly shown in Fig. 1 of the drawings. It will thus be apparent that as the rack-bar 71 is moved outward it will strike the extension 94 and move the cutter-blade, thereby severing the wire at a point above the tie, and the blade is returned to its normal position by means of the springs 95. After the bale thus formed is completed the wires are again secured to the gripping-wheels and the baling action of the plunger will continue, as described in the first operation.

The toothed drum 32^b is loosely mounted on the shaft 32^a and is provided on one of its sides with the spring-pawl 33^a, normally in engagement with the ratchet-wheel 33^b, fixed on the shaft. This construction permits the connecting-bar 25 to be raised when the feeding of the material into the hopper has been stopped, and thereby throwing the needle-operating mechanism out of operation, as heretofore described.

It is obvious that changes may be made in the details of construction and also in the assembling and mounting of the several parts without departing from the general spirit of my invention as defined by the appended claims.

Having fully described my invention, what I claim as new, and desire to secure by Letters Patent, is—

1. In a baling-press, a plunger, means for reciprocating the same, a wire-holding means, a needle-frame pivotally mounted upon said press comprising spaced side bars, pivoted at their rear ends, needles pivotally mounted upon said frame adjacent the forward ends of said bars, means connected to the plunger-reciprocating means for oscillating the needle-frame, and means for throwing the driving means of the needle-frame automatically into and out of operative position upon reciprocation of the plunger, substantially as described.

2. In a baling-press of the type described, a plunger means for reciprocating the same, wire-twisting fingers provided with curved fingers, a slidable frame carrying said twisters, means for operating the said frame, means for rotating the twisters, a cutter slidably mounted above the wire-twisters adapted to be operated by the actuating means of the wire-twisting fingers after the wire has been twisted, a pivoted needle-frame, needles carried thereby, and means for actuating said frame, connected with the plunger, substantially as described.

3. In a baling-press, a needle-frame, comprising side bars spaced apart and pivoted at both ends, needles carried by the said frame, and means for oscillating the said frame, substantially as described.

4. In a baling-press, the combination with the baling-box, of a support secured to the lower side thereof, a pair of studs secured to each side thereof, said studs being spaced apart, a needle-frame comprising side bars pivoted on the said studs, a spacing-block arranged between the forward ends of the said bars, studs secured to the said block, said bars having their forward ends pivoted to the last-named studs, needles, each having a pair of openings in its body portion, in which the studs of the said spacing-block are received, and means for oscillating the said needle-frame, substantially as described.

5. In a baling-press, the combination with a baling-box, of a plunger, means for reciprocating the plunger, a needle-frame, a pair of needles secured thereto, a wire-reel, bell-crank levers pivotally mounted at opposite sides of the baling-box, a pair of rotatably-mounted twisting-fingers, means for operating the twisting-fingers and needles successively, a pair of connecting-rods connected to the plunger and the said bell-crank levers, and means for automatically swinging said connecting-rods into and out of engagement with the said levers, substantially as described.

6. In a baling-press, the combination with the baling-box, provided with a pair of openings in the base and a plunger, of means for reciprocating the plunger, a needle-frame pivoted to the base of the baling-box, needles pivoted to the said frame, said needles operating through the said openings in the base of the baling-box, a frame slidably mounted in the top of the said box, a pair of twisters journaled in the last-named frame and having their forward ends provided with curved fingers, means for rotating the said wire-twisters, means for sliding the said last-named frame, a wire-reel, and means for swinging the said needle-frame, substantially as and for the purpose specified.

7. In a baling-machine, a pair of needles, a pair of rotatable wire-twisters, means for giving the said twisters a partial turn, means for longitudinally moving the twisters after partially turning the same, means for operating successively the needles and rotating the twisters, and a slidably-mounted cutter, said cutter being actuated by the operating means of the wire-twisters, substantially as described.

8. In a baling-machine, a needle, means for reciprocating the said needle, a wire-twister, a pinion on the said wire-twister, a rack-bar for rotating the said wire-twister, means for reciprocating the said rack-bar, a slidable knife-blade provided at its end with an angular extension adapted to be struck by the said rack-bar for moving the blade in one direction, and means for returning the said blade to its normal position, substantially as and for the purpose specified.

9. In a baling-machine, a pair of wire-twisters, means for giving the said twisters a partial turn, means for moving the said twisters longitudinally, after having partially turned them, and means for rotating the said twisters a number of times after they have been moved longitudinally.

10. In a baling-press, the combination with the baling-box, and a plunger mounted therein, of means for reciprocating the plunger, a needle-frame pivoted at a point below the baling-box, needles secured to the said frame to reciprocate through the baling-box behind the bale, a wire-gripper, a frame slidably mounted on top of the baling-box, a pair of wire-twisters journaled in the said frame, means for rotating the said wire-twisters, means for sliding the said frame, a cutter, blade slidably mounted above the wire-twisters, said cutter-blade being operated by the operating mechanism of the wire-twisters after the wire has been twisted, substantially as described.

11. In a baling-press, the combination with the baling-box provided in its sides with longitudinal slots, and the drive-shaft, of a driven shaft, a plunger arranged in the said baling-box and provided with extensions projecting through the slots of the baling-box, pitmen connected to the said driven shaft, and having their forward ends pivotally connected to the said extensions of the plunger, bell-crank levers pivotally mounted on the sides of the baling-box, studs secured to the upper arms of the said bell-crank levers, connecting-rods having their forward ends loosely mounted on the said plunger extensions and provided on their lower edges with cut-out portions to receive the said studs, a transversely-arranged shaft, rock-arms fixed on the said shaft directly beneath the said connecting-rods, a stud carried by one of said arms, a shaft arranged adjacent the rear end of the baling-box, a toothed wheel fixed to the said shaft, and projecting through the bottom of the baling-box, a disk secured on the outer end of the said shaft, said disk being provided with peripheral teeth, a slotted bar eccentrically mounted on the said disk, the stud of the rock-arm being arranged in the slot thereof, a pivotally-mounted needle-frame, links connected to the said bell-crank levers, and needle-frame, wire-twisters, means for rotating the wire-twisters, and a slidably-mounted cutter-blade operated by the means for operating the wire-twisters, substantially as and for the purpose specified.

12. In a baling-machine, the combination with a pair of wire-twisters each provided on its body portion with a single tooth, of pinions arranged on the said wire-twisters in the rear of the said teeth, a pair of rack-bars, means for moving the said twisters whereby said teeth and pinions will be engaged by the said rack-bars alternately, and means for reciprocating the said rack-bars, substantially as described.

13. In a baling-press, the combination with the needle-frame comprising pivoted spaced side bars, needles pivoted in said frame, means for oscillating said frame, rotatable wire-twisters, means for rotating the twisters, means carried by the twisters adapted to engage said last-named means, and means actuated by the needle-frame adapted to actuate the twister-operating means, substantially as described.

14. In a baling-machine, the combination with the baling-box, and the plunger therein, of a casing secured to the top of the said box, wire-grippers journaled on the top of the said casing, a pair of wire-twisters having hooked fingers, said fingers extending into the said casing, means for rotating the said twisters, a knife-blade slidably mounted in the said casing above the said hooked fingers, means for operating the said knife-blade, a pair of needles adapted to project within the said casing during their upward movement, and means for operating the said needles.

In testimony whereof I affix my signature in the presence of two witnesses.

HERMAN SAULER.

Witnesses:
   JOHN NOLAND,
   E. E. POTTER.